2 Sheets—Sheet 1.

E. NORRIS.
Apparatus for Tempering Cream Preparatory to Making Butter.

No. 205,893.      Patented July 9, 1878.

WITNESSES
Wm A Skinkle
Geo W Breck

INVENTOR
Eli Norris,
By his Attorneys
Baldwin, Hopkins, & Peyton.

N. PETERS, PHOTO-LITHOGRAPHER, WASHINGTON, D. C.

2 Sheets—Sheet 2.

E. NORRIS.
Apparatus for Tempering Cream Preparatory to Making Butter.

No. 205,893.     Patented July 9, 1878.

WITNESSES
Wm A Skinkle
Geo W. Breck.

INVENTOR
Eli Norris
By his Attorneys
Baldwin, Hopkins, & Peyton

UNITED STATES PATENT OFFICE.

ELI NORRIS, OF CALIFORNIA, OHIO.

IMPROVEMENT IN APPARATUS FOR TEMPERING CREAM PREPARATORY TO MAKING BUTTER.

Specification forming part of Letters Patent No. 205,893, dated July 9, 1878; application filed December 14, 1877.

*To all whom it may concern:*

Be it known that I, ELI NORRIS, of California, in the county of Hamilton and State of Ohio, have invented an Improved Apparatus for Tempering Cream Preparatory to Making Butter, of which the following is a specification:

It is well known that in cold weather, when the cream is at a low temperature, in churning the butter separates slowly and imperfectly, and is of an indifferent quality and poor color.

The object of my invention is to provide a simple and convenient apparatus by which the cream, in cold weather, may be brought to and maintained at the proper temperature for producing butter of the best quality and color. Experience has demonstrated this temperature to be about 66° Fahrenheit.

Figure 1:
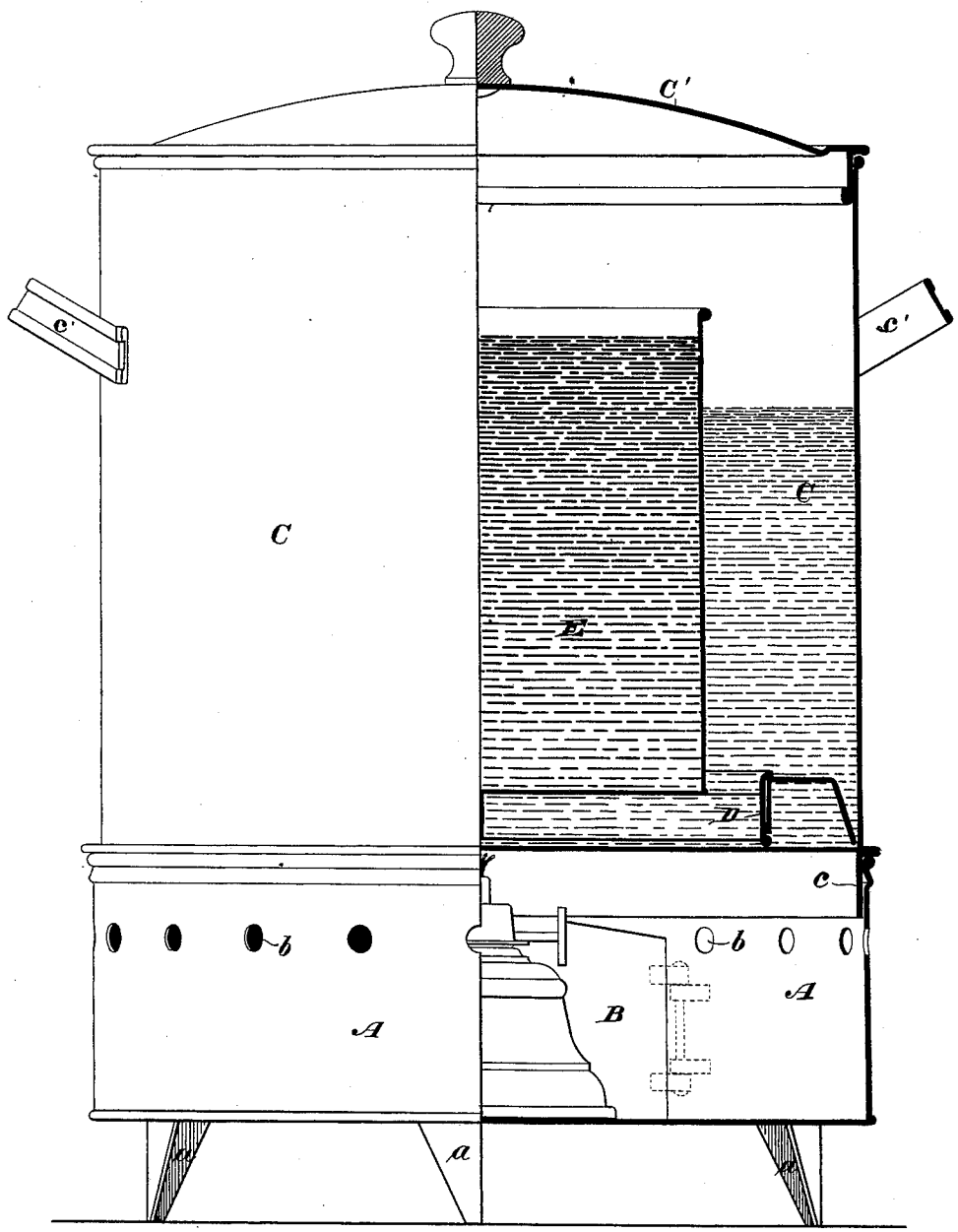
Figure 2:
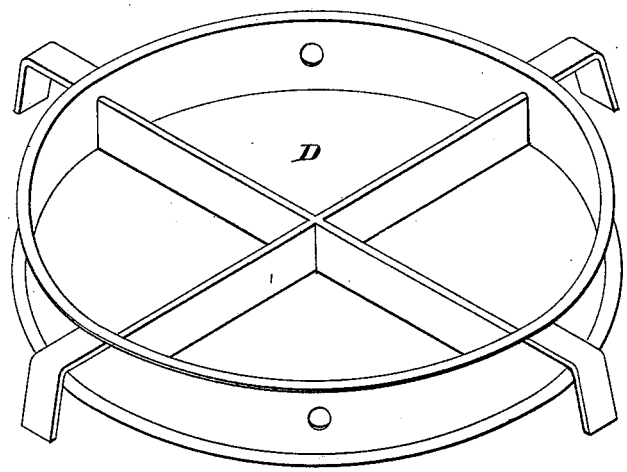

In the accompanying drawings, which illustrate my invention, Figure 1 is a view, partly in elevation and partly in section, of my improved apparatus; and Fig. 2, a perspective view of the skeleton-frame, upon which the cream can or vessel stands.

The lamp-chamber A is shown as supported upon feet or legs $a\ a\ a$, and is provided with a door, B, for the insertion and removal of the lamp, which may be of any ordinary construction. Suitable perforations $b$ are made in the upper part of the chamber for the purpose of supplying air to the lamp.

The heating or tempering chamber C is mounted upon the lamp-chamber, and is held in place there by a flange, $c$, which extends down into the chamber. The tempering-chamber is provided with a cover, C', and handle $c'\ c'$. Within this chamber, and resting loosely on its bottom, is a detachable skeleton frame or stand, D, upon which the can or receptacle E, for containing the cream, stands. The apparatus may readily be taken apart for the purpose of cleaning it.

The cream to be tempered is placed in the can E, which stands upon the skeleton-frame D within the tempering-chamber, that is partly filled with water. The water surrounds the cream-can on its sides and bottom, and uniformly distributes the heat from the lamp, and prevents overheating. The desired temperature of the cream may be indicated by testing with a thermometer.

By this apparatus, which is simple and portable, in cold weather the cream can always be brought to and maintained at a uniform temperature, so as to be churned to the best advantage as respects the quantity, quality, and color of the butter to be produced.

Having thus described my invention, what I claim as new, and desire to secure by Letters Patent, is—

The combination of the lamp-chamber A, the detachable tempering-chamber C, for containing water, the removable skeleton frame or stand D, and the cream-receptacle E, constructed and operating together substantially as described.

In testimony whereof I have hereunto subscribed my name.

ELI NORRIS.

Witnesses:
ALEX. PADDOCK,
S. M. QUINN.